US008052122B2

(12) United States Patent
Rossato et al.

(10) Patent No.: US 8,052,122 B2

(45) Date of Patent: Nov. 8, 2011

(54) PARALLELOGRAM LIFT FOR MOTOR VEHICLES

(75) Inventors: Eride Rossato, Mirano (IT); Alberto Comand, Mirano (IT)

(73) Assignee: O.ME.R. S.p.A., Mirano (IT)

( * ) Notice: Subject to any disclaimer, the term of this patent is extended or adjusted under 35 U.S.C. 154(b) by 755 days.

(21) Appl. No.: 12/223,296

(22) PCT Filed: Jan. 31, 2007

(86) PCT No.: PCT/EP2007/050957

§ 371 (c)(1), (2), (4) Date: Jul. 28, 2008

(87) PCT Pub. No.: WO2007/088178

PCT Pub. Date: Aug. 9, 2007

(65) Prior Publication Data

US 2009/0020736 A1 Jan. 22, 2009

(30) Foreign Application Priority Data

Feb. 2, 2006 (IT) .............................. VE2006A0004

(51) Int. Cl.
*B60B 31/06* (2006.01)

(52) U.S. Cl. ....... 254/124; 254/122; 254/10 C; 254/8 B; 254/2 B

(58) Field of Classification Search .................. 254/124, 254/122, 125, 126, 10 C, 9 C, 9 B, 2 B, 89 H, 254/93 R, 93 L
See application file for complete search history.

(56) References Cited

U.S. PATENT DOCUMENTS

| | | | | | |
|---|---|---|---|---|---|
| 3,865,347 | A * | 2/1975 | Pase | 254/124 |
| 4,447,042 | A | 5/1984 | Saburo | |
| 4,899,987 | A * | 2/1990 | Craig | 254/122 |
| 4,901,980 | A * | 2/1990 | Hansen | 254/9 C |
| 5,184,914 | A * | 2/1993 | Basta | 405/3 |
| 5,340,082 | A * | 8/1994 | Holloway | 254/88 |
| 5,695,173 | A * | 12/1997 | Ochoa et al. | 254/122 |
| 6,318,929 | B1 * | 11/2001 | Basta | 405/3 |
| 2001/0025952 | A1 * | 10/2001 | Wanner | 254/124 |

FOREIGN PATENT DOCUMENTS

| | | |
|---|---|---|
| DE | 707 098 | 6/1941 |
| DE | 37 09 832 | 10/1988 |

* cited by examiner

*Primary Examiner* — Lee D Wilson
(74) *Attorney, Agent, or Firm* — Themis Law

(57) ABSTRACT

Parallelogram lift for motor vehicles, comprising a pair of base longitudinal members (2), a pair of runways (12) and at least two pairs of arms (14, 14') hinged to the longitudinal members (2) and to the runways (12) and associated with members (30) for varying the inclination of said arms (14, 143 to the longitudinal members (2) and to the runways (12), wherein each longitudinal member (2) comprises a fixed base (4, 6) anchored to the floor, and a counter-base (8) slidable axially relative to the fixed base and carrying the arms (14, 143) hinged thereto, and also comprises for each longitudinal member (2) an auxiliary arm (22) hinged at its lower end to a support (26) fixed to the floor in alignment with the longitudinal member and pivoted at its upper end to the central point (20) of the adjacent main arm (14), the length of the auxiliary arm (22) between its pivotal axes (24, 20) being equal to one half the length of the main arms (14, 14').

5 Claims, 2 Drawing Sheets

Figures 1, 2:
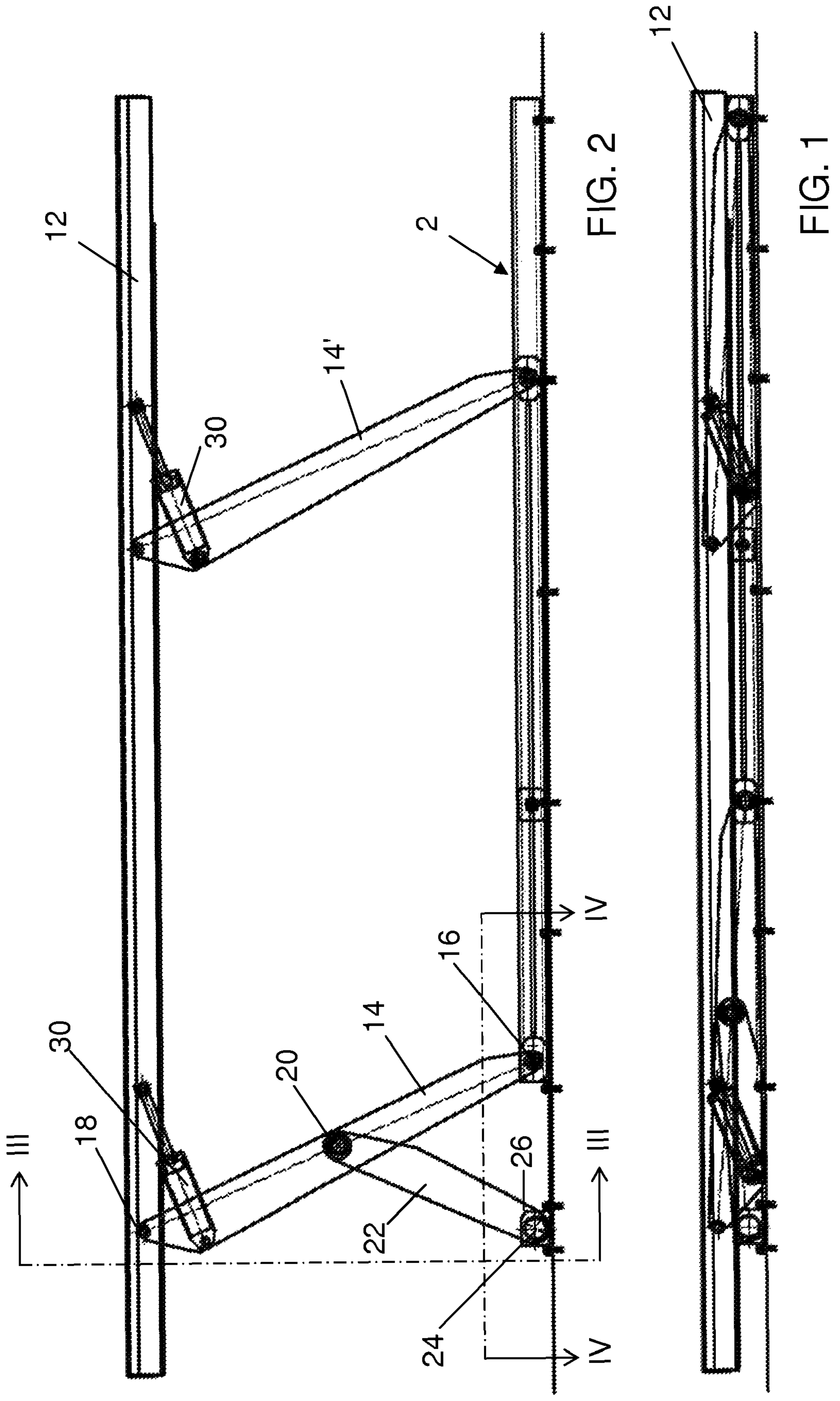

12
2
14'
30
14
16
20
18
26
22
24
III
IV

PARALLELOGRAM LIFT FOR MOTOR VEHICLES

The present invention relates to an improved parallelogram lift for motor vehicles.

Known motor vehicle lifts generally comprise a pair of longitudinal members fixed to the floor, a pair of runways overlying said longitudinal members and movable vertically thereto, and at least two pairs of arms hinged to said longitudinal members and to said runways and associated with actuators, generally consisting of hydraulic cylinder-piston units which control the inclination of the arms relative to the longitudinal members and to the runways to hence cause the runways and the vehicle positioned thereon to rise and descend.

Vehicle lifts are basically divided into two categories: pantograph lifts and parallelogram lifts.

In pantograph lifts the arms of each pair are crossed such that besides being hinged to the runways and to the base longitudinal members, they are also pivoted together at their central point. The lift is generally of fairly laborious construction, and during use the load distribution varies in passing from the lift-lowered to the lift-raised condition. This is because during raising, the two points at which each runway rests on the pivoted arms approach each other in a non-centered manner, as one point remains at rest while the other moves relative to that which remains at rest.

In parallelogram lifts the arms always remain parallel to each other and, together with those parts of the runways and longitudinal members lying between the mutual pivotal points, form a deformable articulated parallelogram.

In this case the lift is of relatively simple construction and reliable operation, and moreover does not involve load distribution variations in passing from the lift lowered condition to the lift raised condition. However, known parallelogram lifts present a serious drawback consisting of the fact that the lifting stroke of the runways does not involve a purely vertical translatory movement, as in the case of pantograph lifts, but instead a vertical translatory movement accompanied by a horizontal translatory movement. This results in the need for greater space to enable the runways to also move longitudinally, and the impossibility of using the lift to carry out certain work, such as vehicle engine replacement, which normally requires a perfectly vertical lift descent. Moreover as in some cases the lift is installed in a pit, the pit length must be equal to the length of the lift when lowered, meaning that when the lift is raised those parts of the pit which the raising of the lift has left uncovered must be covered for safety reasons.

An object of the invention is to provide a parallelogram lift for motor vehicles which does not present the drawbacks of known parallelogram lifts and in particular enables a purely vertical runway movement to be obtained during raising and descent.

This and other objects which will be apparent from the ensuing description are attained according to the invention by an improved parallelogram lift for motor vehicles as described in claim 1.

Figure 3:
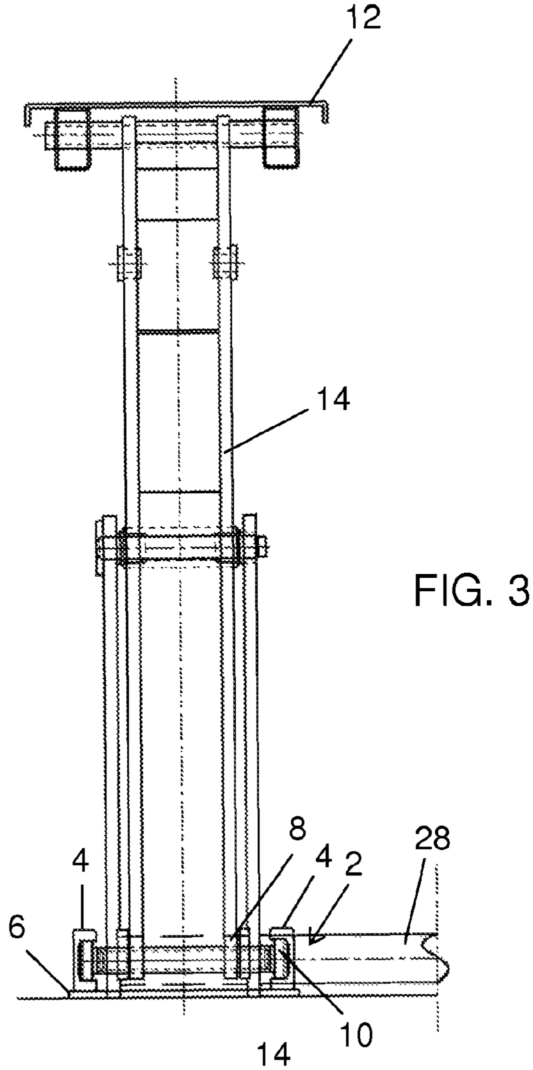
Figure 4:
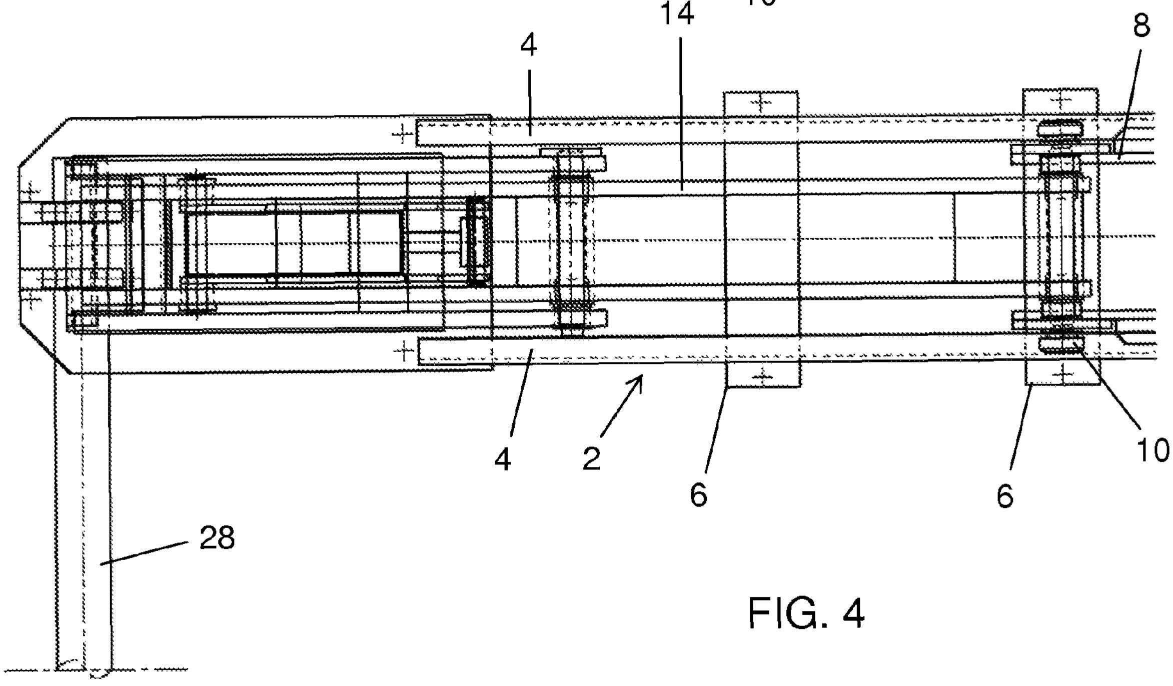

A preferred embodiment of the present invention is described in detail hereinafter by way of non-limiting example with reference to the accompanying drawings, in which:

FIG. 1 is a side view of a lift according to the invention in its lowered condition, FIG. 2 shows it in the same view as FIG. 1 but in its raised condition, FIG. 3 is a partial front view thereof in the direction of the line III-III of FIG. 2, and FIG. 4 is a partial plan view thereof in the direction of the line IV-IV of FIG. 2.

As can be seen from the figures, the lift of the invention comprises a pair of longitudinal members, indicated overall by 2, each comprising a pair of C profiles 4 welded to a plurality of brackets 6 for their fixing to the floor, and a counter-base 8 consisting of a rigid structure provided with bearings 10 slidable in the longitudinal cavity of the two C profiles 4, to provide longitudinal mobility of said counter-base 8 relative to said C profiles. The bearings 10 can also be replaced by slide members.

The lift of the invention also comprises a pair of runways 12 associated with the longitudinal members 2 and connected to the counter-bases 8 thereof by pairs of articulated arms 14, 14'.

Each articulated arm 14, i.e. the left arm when observing FIG. 2, besides being hinged at its lower end at 16 to the counter-base 18 and at its upper end at 18 to the corresponding runway 12, is also pivoted at its central point 20 to the upper end of an auxiliary arm 22 which has its lower end pivoted at 24 to a bracket 26 fixed to the floor in alignment with the longitudinal member 2. The length of said auxiliary arm, measured between its pivotal axes, is equal to one half the length of the main arms 14, 14'.

The two auxiliary arms 22 relative to the two longitudinal members 2 are connected together by a torsion bar 28 the purpose of which is to distribute between the two runways 12 the total load represented by the weight of the liftable parts, and hence to compensate inevitable load non-uniformities between the two runways 12.

Hydraulic cylinder-piston units 30 are interposed in traditional manner between the arms 14, 14' and the runways 12, to control the raising and descent of the lift when suitably fed with pressurized oil.

From the aforegoing description, by simple geometrical considerations it is apparent that to raise the lift, the operative fluid must be fed into the cylinder-piston units 30 to hence cause the articulated parallelogram to deform and raise the runways. However, because of the presence of the auxiliary arms 22, as the lift rises the constraint applied by the two auxiliary arms 22 means that the counter-base 8 slides along the two C profiles 4, in such a manner as to exactly compensate any tendency of the runways 12 to translate longitudinally, hence causing them to rise by perfectly vertical translation.

The same occurs during descent.

It is therefore apparent that the lift of the invention, although of parallelogram type and presenting substantially all the advantages of traditional parallelogram lifts compared with pantograph lifts, differs from traditional parallelogram lifts by the fact that their runways rise with purely vertical movement.

Consequently all the aforesaid drawbacks of parallelogram lifts are eliminated.

The lift also comprises all those members normally provided in any lift, i.e. connections between the cylinder-piston units 30 and an oil pumping station, safety devices to prevent the lift from falling in the case of accidental breakage of the connections to the cylinder-piston units 30, safety valves within the feed circuit to the cylinder-piston units 30, safety devices to prevent damage in the case of operational errors, etc. As all these members are of traditional type and do not modify the general principle on which the present invention is based, they have been omitted to prevent unnecessary amplification of the present description.

The invention claimed is:

1. A parallelogram lift for motor vehicles, comprising
a pair of base longitudinal members,
a pair of runways and
at least two pairs of arms hinged to said longitudinal members and to said runways and
members for varying the inclination of said arms to said longitudinal members and to said runways,
wherein each longitudinal member comprises
a fixed base anchored to the floor,
a counter-base axially slidable relative to said fixed base and carrying said arms hinged to the counterbase, an auxiliary arm hinged at its lower end to a support fixed to the floor in alignment with said longitudinal member and pivoted at its upper end to a central point of an adjacent arm, the length of said auxiliary arm between its pivotal axes being equal to one half the length of said main arms.

2. A lift as claimed in claim 1, wherein the fixed base of each longitudinal member comprises a pair of C-shaped profiles connected to a plurality of brackets for their fixing to the floor and having their longitudinal cavities facing each other.

3. A lift as claimed in claim 2, wherein the counter-base of each longitudinal member comprises a rigid structure provided with rolling members slidable along the cavity of the C-shaped profiles.

4. A lift as claimed in claim 2, wherein the counter-base of each longitudinal member comprises a rigid structure provided with sliding members slidable along the cavity of the C-shaped profiles.

5. A lift as claimed in claim 1, wherein the lower end of each auxiliary arm is directly hinged to a fixed part of a longitudinal member.

* * * * *